United States Patent
Sieradzki (10) Patent No.: US 10,259,155 B2
(45) Date of Patent: Apr. 16, 2019

(54) PREFORM FOR A BLOW MOLDING OPERATION

(71) Applicant: Discma AG, Hünenberg (CH)

(72) Inventor: Richard Sieradzki, Frankfort, IL (US)

(73) Assignee: DISCMA AG, Hunenberg (CH)

( * ) Notice: Subject to any disclaimer, the term of this patent is extended or adjusted under 35 U.S.C. 154(b) by 12 days.

(21) Appl. No.: 15/637,541

(22) Filed: Jun. 29, 2017

(65) Prior Publication Data

US 2019/0001548 A1  Jan. 3, 2019

(51) Int. Cl.
| | |
|---|---|
| *B29C 49/06* | (2006.01) |
| *B29C 49/78* | (2006.01) |
| *B65B 3/02* | (2006.01) |
| *B29B 11/14* | (2006.01) |
| *B29C 49/00* | (2006.01) |
| *B29C 49/02* | (2006.01) |
| *B29C 49/22* | (2006.01) |
| *B29C 49/46* | (2006.01) |
| *B29K 23/00* | (2006.01) |
| *B29C 49/12* | (2006.01) |
| *B29L 9/00* | (2006.01) |

(52) U.S. Cl.
CPC .............. *B29C 49/06* (2013.01); *B29B 11/14* (2013.01); *B29C 49/0073* (2013.01); *B29C 49/02* (2013.01); *B29C 49/22* (2013.01); *B29C 49/46* (2013.01); *B29C 49/786* (2013.01); *B65B 3/022* (2013.01); *B29B 2911/141* (2013.01); *B29B 2911/1408* (2013.01); *B29B 2911/1424* (2013.01); *B29B 2911/14086* (2013.01); *B29B 2911/14093* (2013.01); *B29B 2911/14113* (2013.01); *B29C 2049/027* (2013.01); *B29C 2049/1266* (2013.01); *B29C 2049/222* (2013.01); *B29C 2049/225* (2013.01); *B29C 2049/4664* (2013.01); *B29K 2023/12* (2013.01); *B29K 2995/0015* (2013.01); *B29L 2009/005* (2013.01)

(58) Field of Classification Search
USPC ............... 264/454–459; 428/34.1, 35.7, 36.9
See application file for complete search history.

(56) References Cited

U.S. PATENT DOCUMENTS

| | | | | |
|---|---|---|---|---|
| 3,449,479 | A | * 6/1969 | Cines | ...................... B05D 7/22 264/513 |
| 6,632,493 | B1 | * 10/2003 | Hildebrand, IV | ... B65D 1/0215 222/206 |
| 8,573,964 | B2 | 11/2013 | Andison et al. | |
| 2002/0182351 | A1 | * 12/2002 | Akiyama | ................ B29B 11/06 428/35.7 |

(Continued)

OTHER PUBLICATIONS

Table of thermal properties of plastic materials obtained from the Professional Plastics website (no date).*

*Primary Examiner* — Marc S Zimmer
(74) *Attorney, Agent, or Firm* — Michael E. Dockins; Shumaker, Loop & Kendrick, LLP (57) ABSTRACT

A method and a preform for blow molding to form a plastic container are disclosed, the preform having a coating formed on an inner surface thereof. The coating reduces a loss of heat energy from the heated preform during expansion thereof to ensure the preform maintains a temperature at or above the phase change/solidification temperature of the material forming the preform.

20 Claims, 5 Drawing Sheets

(56) References Cited

U.S. PATENT DOCUMENTS

2006/0099363 A1* 5/2006 Farha .................. B05D 3/0263
428/35.7
2008/0251488 A1* 10/2008 Uesugi ............... B29C 49/0073
215/12.2

* cited by examiner

PREFORM FOR A BLOW MOLDING OPERATION

FIELD OF THE INVENTION

This invention relates to preforms for forming plastic containers and, more particularly, to preforms having a coating on an inner surface thereof formed dip, spray, placement, or flow coating, for example.

BACKGROUND OF THE INVENTION

Preforms are the products from which containers are made by blow molding. Unless otherwise indicated the term "container" is a broad term and is used in its ordinary sense and includes, without limitation, both the preform and bottle container therefrom. A number of plastic and other materials have been used for containers and many are quite suitable. Some products such as carbonated beverages and foodstuffs need a container, which is resistant to the transfer of gases such as carbon dioxide and oxygen. A resin now widely used in the container industry is polyethylene terephthalate (PET), by which term we include not only the homopolymer formed by the polycondensation of [beta]-hydroxyethyl terephthalate but also copolyesters containing minor amounts of units derived from other glycols or diacids, for example isophthalate copolymers.

Traditionally blow molding and filling have developed as two independent processes, in many cases operated by different companies. In order to make bottle filling more cost effective, some fillers have moved blow molding in house, in many cases integrating blow molders directly into their filling lines. The equipment manufacturers have recognized this advantage and are selling "integrated" systems that are designed to insure that the blow molder and the filler are fully synchronized. Despite the efforts in bringing the two processes closer together, blow molding and filling continue to be two independent, distinct processes. As a result, significant costs may be incurred while performing these two processes separately. Thus, efforts have been undertaken to develop a liquid or hydraulic blow molding system suitable for forming and filling a container in a single operation.

One process for simultaneously forming and filling a container is described in U.S. Pat. No. 8,573,964, hereby incorporated herein in its entirety by reference. During the process disclosed in the '964 patent a PET preform is heated prior to enter the blow molding system. The preform will exit an oven at about 140° C. During the molding process the temperature of the preform desirably stays between about 140° C. and about 63° C. (the phase change/solidification temperature of PET) to ensure resulting containers that are aesthetically and functionally desired. Accordingly, containers must be formed at or above the phase change/solidification temperature of the material used to form the container. The heated preform at its maximum temperature has a known (or knowable) amount of heat energy available to be distributed during formation of the container during the blow molding operation.

During the blow molding operation, heat energy is lost to the mold surrounding the preform, to the fluid used to expand the heated preform into the container, and heat energy is distributed along the larger surface area of the container formed from the stretched and blown preform. A portion of the heat energy of the preform is provided in the neck finish. The heat energy in the neck finish is unavailable for loss and/or distribution during the blow molding process because the neck finishes not being contacted by the fluid used for the blow molding operation nor disfigured or otherwise affected by the blow molding operation. Accordingly, a lesser portion of the total heat energy of the heated preform is available for distribution to the blow/fill fluid, mold, etc. Accordingly, undesirable heat losses may affect a consistency in the forming and filling of containers. It would be desirable to develop a preform and method of forming containers that maintains thermal properties of a heated preform during an expansion and filling thereof.

SUMMARY OF THE INVENTION

Concordant and congruous with the present invention, a preform and method of forming containers that maintains thermal properties of a heated preform during an expansion and filling thereof has surprisingly been discovered.

In an embodiment of the invention, a preform for blow molding to form a plastic container comprises a neck portion forming an opening providing fluid communication with an interior of the preform; a body portion having a closed end cap, the neck portion and the body portion forming an inner surface; and a coating formed on the inner surface of the body portion of the preform, the coating having a thermal conductivity less than a thermal conductivity of a material forming the preform.

In another embodiment of the invention a method of simultaneously forming and filling a container comprises disposing a heated preform having a coating on an inner surface thereof in a mold cavity, the coating having a thermal conductivity less than a thermal conductivity of a material forming the preform; delivering a liquid into the preform thereby expanding the preform and the coating toward an interior surface of the mold cavity to form a resulting container, wherein the coating reduces a loss of heat energy from the heated preform during the delivering step; and wherein the liquid remains within the container as an end product.

In another embodiment of the invention, a method of simultaneously forming and filling a container comprises disposing a heated preform having a sacrificial coating on an inner surface thereof in a mold cavity, the coating having a thermal conductivity less than a thermal conductivity of a material forming the preform; delivering a liquid into the preform thereby expanding the preform and the coating toward an interior surface of the mold cavity to form a resulting container, wherein the coating dissolves into the liquid or evaporates to reduce a loss of heat energy from the heated preform during the delivering step to ensure the preform maintains a temperature at or above the phase change/solidification temperature of the material forming the preform; and wherein the liquid remains within the container as an end product.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. Furthermore, disclosed methods provide for a coating to be placed on an article, specifically a preform, which is later blown into a bottle. Such methods are, in many instances, preferable to placing coatings on the bottles themselves. Preforms are smaller in size and of a more regular shape than the containers blown therefrom, making it simpler to obtain an even and regular coating. Furthermore, bottles and containers of varying shapes and sizes can be made from preforms of similar size and shape. Thus, the same equipment and processing can be used to coat preforms to form several different types of containers. The blow molding process may take place soon after molding and coating, or preforms may be made and stored for later blow molding. If the preforms are stored prior to blow molding operation, their smaller size allows them to take up less space in storage.

Figure 1:
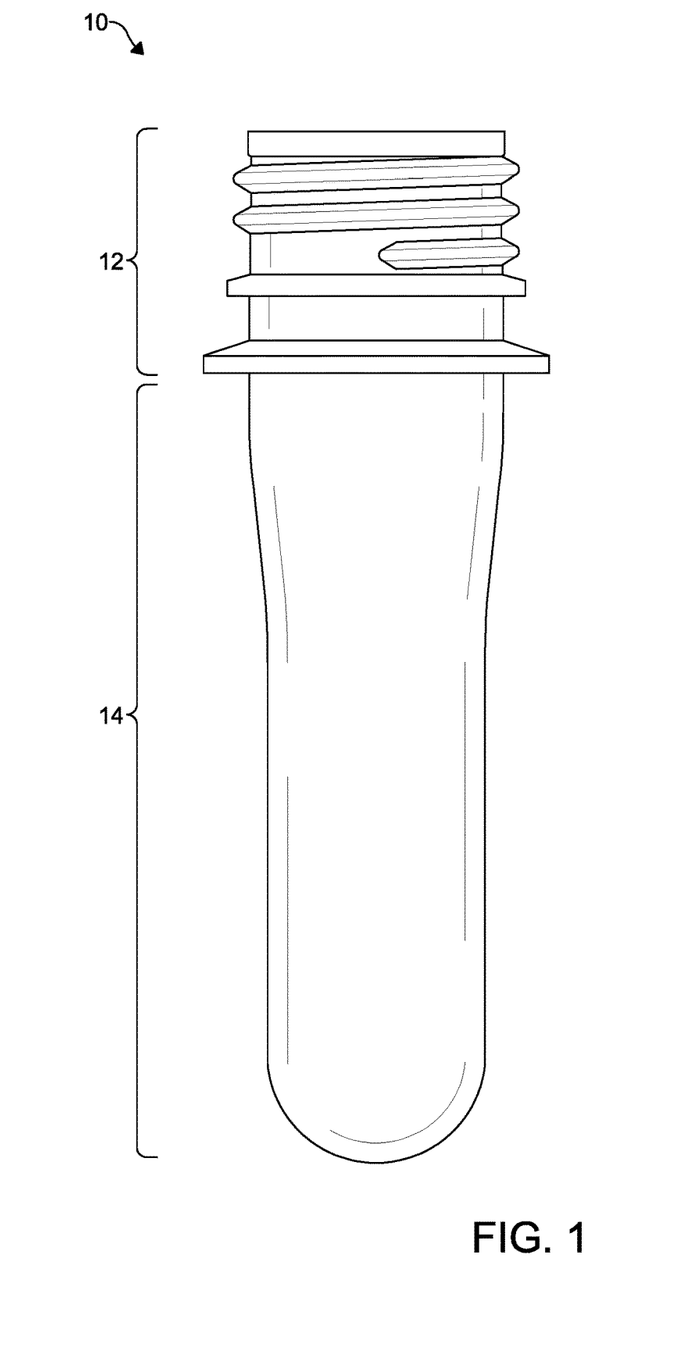
FIG. 1 is an uncoated preform as is used as a starting material for the embodiments of the invention.

Referring to FIG. 1, an uncoated preform 10 is depicted. The preform 10 is preferably made of an FDA approved material such as virgin PET and can be of any of a wide variety of shapes and sizes. The preform may be formed from other materials such as recycled PET, HDPE, PE, PP, and/or any other polymer suitable for blow molding, as desired. The preform 10 shown in FIG. 1 is a 24 gram preform of the type which will form a 16 oz. water bottle, but as will be understood by those skilled in the art, other preform configurations, material weights, lengths, and sizes can be used depending upon the desired configuration, characteristics and end use of the container formed therefrom. The uncoated preform 10 may be formed by injection molding as is known in the art or by other suitable methods.

Figure 2:
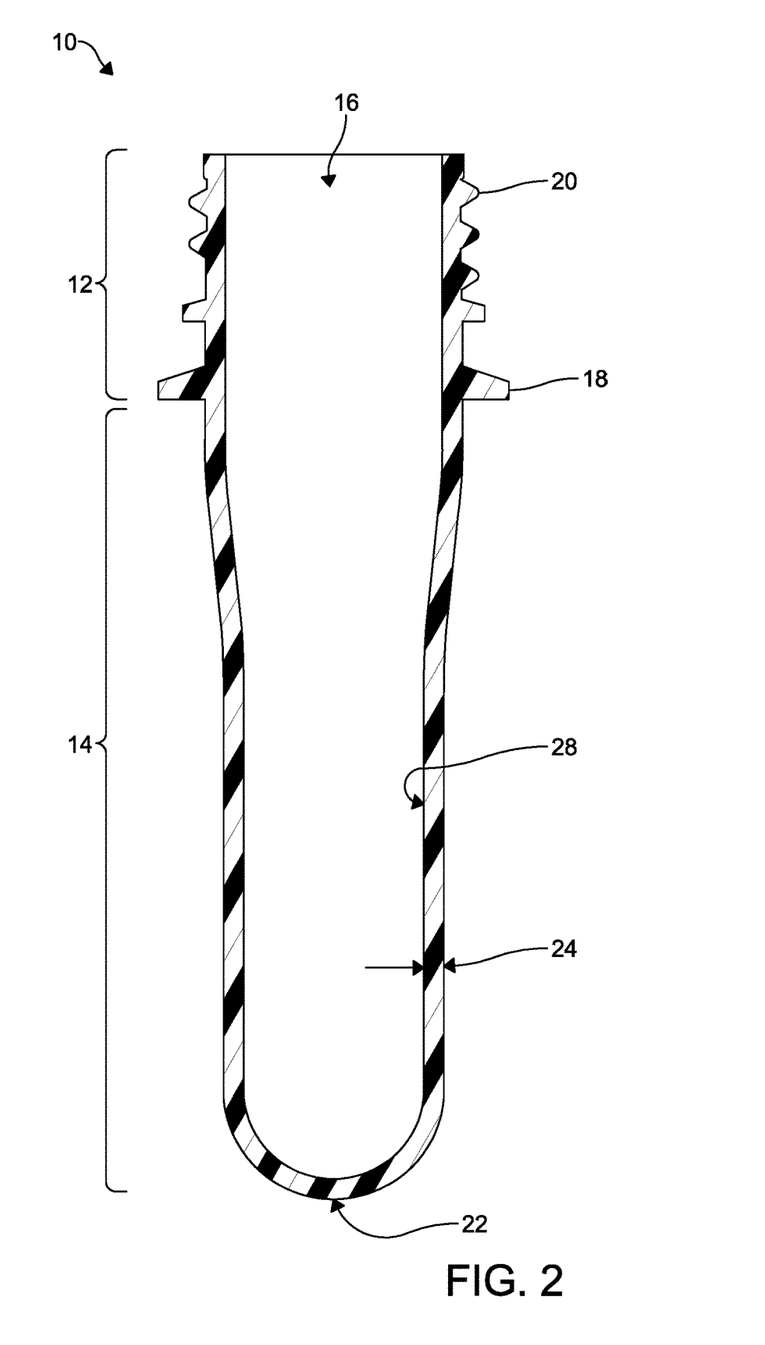
FIG. 2 is a cross-sectional view of an uncoated preform shown in FIG. 1.

A cross-sectional view of the preform 10 is shown in FIG. 2. The uncoated preform 10 has a neck portion 12 and a body portion 14. The neck portion 12, also referred to as the neck finish or the finish, forms an opening 16 providing fluid communication with an interior of the preform 10. The neck portion extends from the opening 16 to and including a support ring 18 (also known as the shoulder). The neck portion 12 is further characterized by the presence of threads 20, which provide a means to fasten a cap (not shown) to a bottle (not shown) produced from the preform 10. The body portion 14 is an elongated and cylindrically shaped structure extending from the neck portion 12 and culminating in a rounded end cap 22. A thickness of the preform 24 will depend upon the overall length of the preform 10 and a desired wall thickness and overall size of the resulting container. The thickness 24 may also vary along the length of the preform 10 if the resulting container is asymmetrical or otherwise requires varied thickness along a wall(s) thereof. It should be noted that as the terms "neck" and "body" are used herein, in a container that is colloquially called a "longneck" container, the elongate portion just below the support ring, threads, and/or shoulder where the cap is fastened would be considered part of the "body" of the container and not a part of the "neck".

Figure 3:
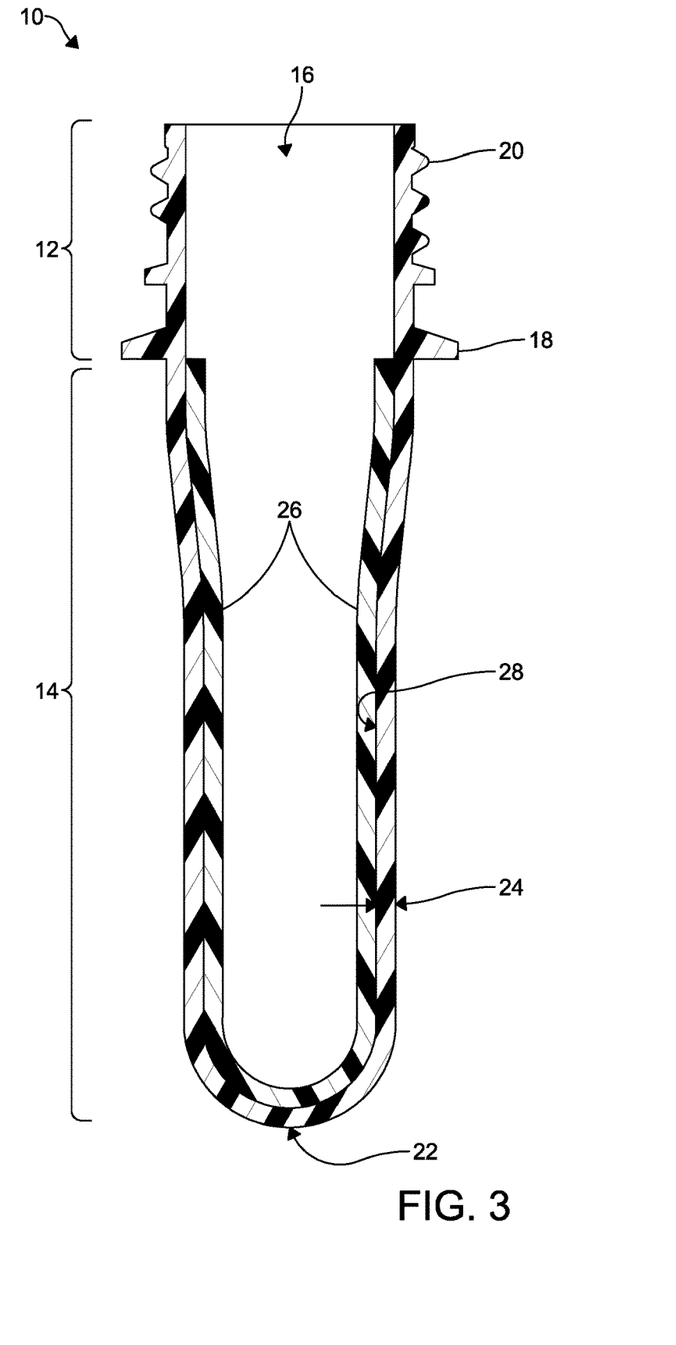
FIG. 3 is a cross-sectional view of the preform of FIG. 2 with a coating on a portion of an inner surface thereof according to an embodiment of the invention.

FIG. 3 shows an inner surface 28 of the preform 10 of FIGS. 1 and 2 having a substantially continuous (or unbroken) coating 26 with a substantially uniform thickness formed thereon. In the embodiment shown in FIG. 3, the coating 26 is disposed about the entire surface of the body portion 14, terminating at or below the support ring 18. The coating does not extend to the neck portion 12. In certain embodiments (not shown), it may be desirable for the coating 26 to extend to the neck portion 12, or the coating 26 may inadvertently be present on the neck portion 12 due to over spraying or the like during the deposition thereof on the inner surface 28, for example. The coating 26 may comprise one layer of a single material, one layer of several materials combined, or several layers of at least two materials. Polymeric preforms having multiple layers are well known in the art with the known multi-layer preforms designed with layers intended to remain intact to improve a feature of the preform and resulting container. Multi-layer preforms may include a coating or layer to form a vapor barrier, a gas barrier, a color layer for aesthetics or to block light or UV energy. On the other hand, the coating 26 is formed from any frangible and/or dissolvable material having a lower thermal conductivity than the material from which the preform 10 is formed. The coating 26 may be formed from a solid material, a semi-solid material, a gel, or a high-viscosity liquid, as desired. Suitable coatings include petroleum jelly, silicone, paraffin wax, or polypropylene, or a combination of the foregoing, for example, as desired. The coating 26 may also be a component of an end product that will fill the resultant container. For example, the coating 26 may be a colorant, sugar, a surfactant, an odorizing agent, or the like that is intended to interact, dissolve in, and/or mix with a fluid that resides in the resulting container to provide such that the combined material from the coating 26 and the fluid form a desired end product therein.

The coating 26 may be formed on the inner surface 28 of the preform 10 by any appropriate method such as spray coating, flow coating, or other manual or automated methods of disposing a gel or liquid onto the inner surface. Once applied, the coating 26 may be processed further, as desired. For example, the coating 26 may be cured, dried, or cooled, as necessary, or excess material forming the coating 26 may be removed from the preform 10.

Once the preform 10 has the coating 26 formed on the inner surface 28 thereof is provided, the preform 10 may be processed to form a resulting container. At the outset the preform 10 is heated to a temperature above its phase change/solidification temperature. For a preform 10 formed from PET, the preform is raised to a temperature of from between about 190° F. to about 250° F. (approximately 88° C. to 121° C.) in an oven and then placed into a mold cavity (not shown). The heated preform 10 is then disposed in a mold cavity (not shown). Halves of the mold cavity close around the heated preform 10 with the neck portion 12 disposed thereabove, and the body portion 14 disposed therein. A blow nozzle (not shown) is then disposed adjacent to or abutting the preform 10 and the blow nozzle may form a seal at the neck portion 12 of the preform 10. The mold cavity may be heated, for example to a temperature between approximately 250° F. to 350° F. (approximately 93° C. to 177° C.), in order to impart increased crystallinity levels within the resulting container. In another example, the mold cavity may be provided at ambient or cold temperatures between approximately 32° F. to 90° F. (approximately 0° C. to 32° C.), as desired.

A stretch rod (not shown) may extend into the preform 10 to initiate mechanical stretching. At this time, the coating 26 may also stretch or may begin to fracture, as desired. The coating 26 is adapted to maintain its thermal properties during the stretching operation. The stretch rod continues to stretch the preform 10 and the coating 26 thereby thinning the sidewalls of the body portion 14 and the coating 26. At this time, a pressure source, such as a piston-like device (pneumatic, mechanical and/hydraulic pressure) or a servo system, may begin to initiate the rapid transfer of a desired quantity of liquid to an interior of the preform 10. The liquid causes the preform 10 and the coating 26 to expand toward an interior surface of the mold cavity. Residual air may be vented through the stretch rod, as desired.

During the expansion of the preform 10 caused by the liquid, the coating 26 acts to reduce a loss of heat energy from the preform 10 to the liquid, the residual air, and/or the mold cavity that is contacted by the expanding preform 10. The loss of heat energy is reduced because the coating 26 has a lower thermal conductivity than the material forming the preform 10. In reducing heat energy losses from the preform 10, the coating 26 facilitates the maintenance of the thermal properties of the heated preform 10 during an expansion and filling thereof to ensure that the preform 10 maintains a temperature at or above the phase change/solidification temperature of the material forming the preform 10 (e.g., about 63° C. for PET) until the resulting container is formed. By ensuring that the preform 10 maintains a temperature at or above the phase change/solidification temperature of the material forming the preform 10 during the blowing operation, the appearance and performance of the resulting container is improved. The precise mechanism by which the coating 26 may reduce the loss of heat energy from the preform 10, but the mechanism may be by the coating 26 dissolving into the liquid, evaporating, or any other chemical or mechanical mechanism. In this way, the coating 26 is, at least partially, a sacrificial coating. As described hereinabove, the coating 26 may be a constituent of the end product that resides in the resulting container once mixed with, dissolved into, or chemically reacted with the liquid used to form the container.

Once the container is formed, the stretch rod may be withdrawn from the mold cavity while continuing to vent residual air. The stretch rod may be designed to displace a predetermined volume of the liquid when the stretch rod is withdrawn from the mold cavity, thereby allowed for a desired fill level of the liquid within the resulting container and/or a desired headspace. Generally, the desired fill level and/or headspace will correspond to a height at or near the level of the support ring 18 of the resulting container.

Figure 4:
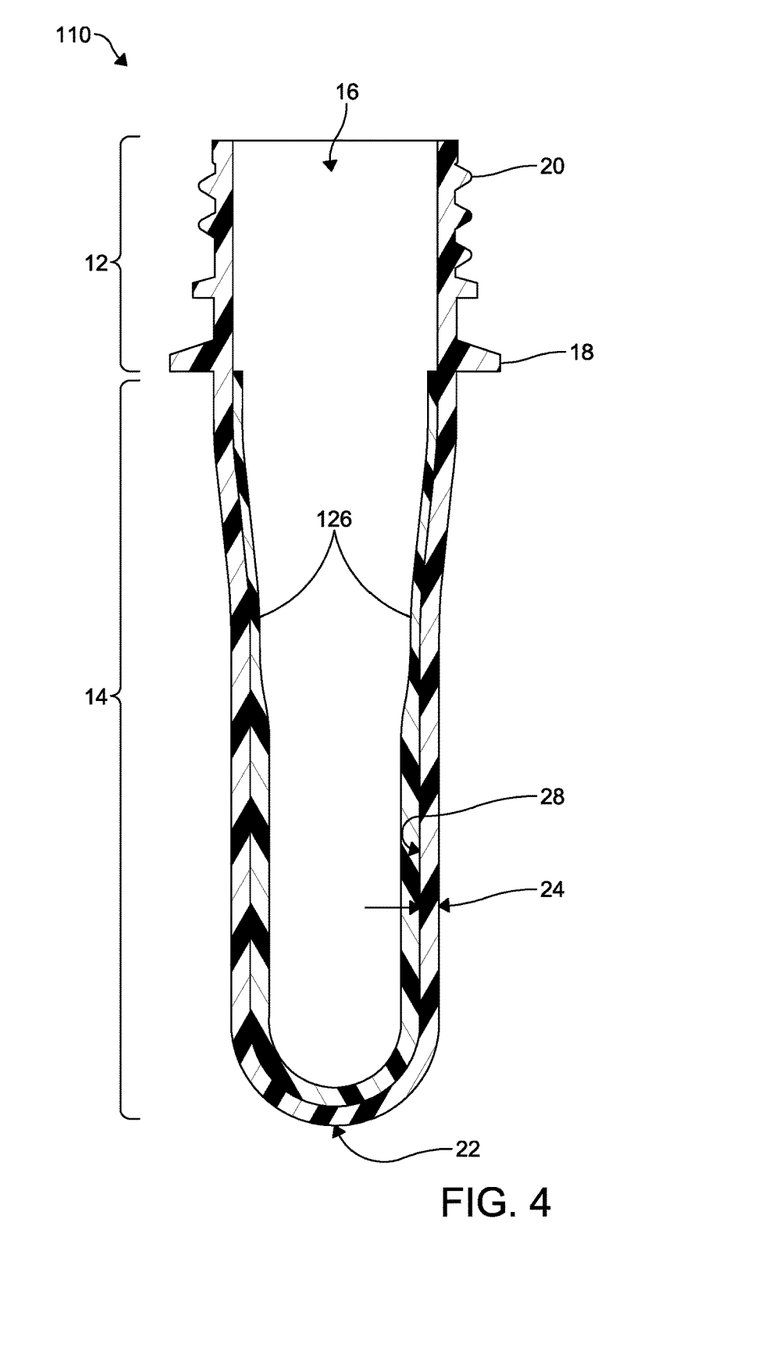
FIG. 4 is a cross-sectional view of a preform with a coating according to another embodiment of the invention.

FIG. 4 shows a preform 110 similar to the preform 10 described hereinabove and illustrated in FIGS. 1-3 except that a coating 126 formed on an inner surface 28 thereof has a varied thickness. The variation in the thickness of the coating 126 may depend on a number of factors including, but not limited to, the size of the preform 110, the shape of the preform 110, and the shape of a resulting container (not shown) of the preform 110 (e.g., an asymmetrically-shaped resulting container). It is desirable to include a thicker coating 126 where increased losses of heat energy from the preform 110 during the forming and filling process described herein are anticipated. It is understood that the varied thickness of the coating 126 may be symmetrical or random, as desired, and the thickness may be greater nearer the neck portion 12 or the end cap 22, as desired.

Figure 5:
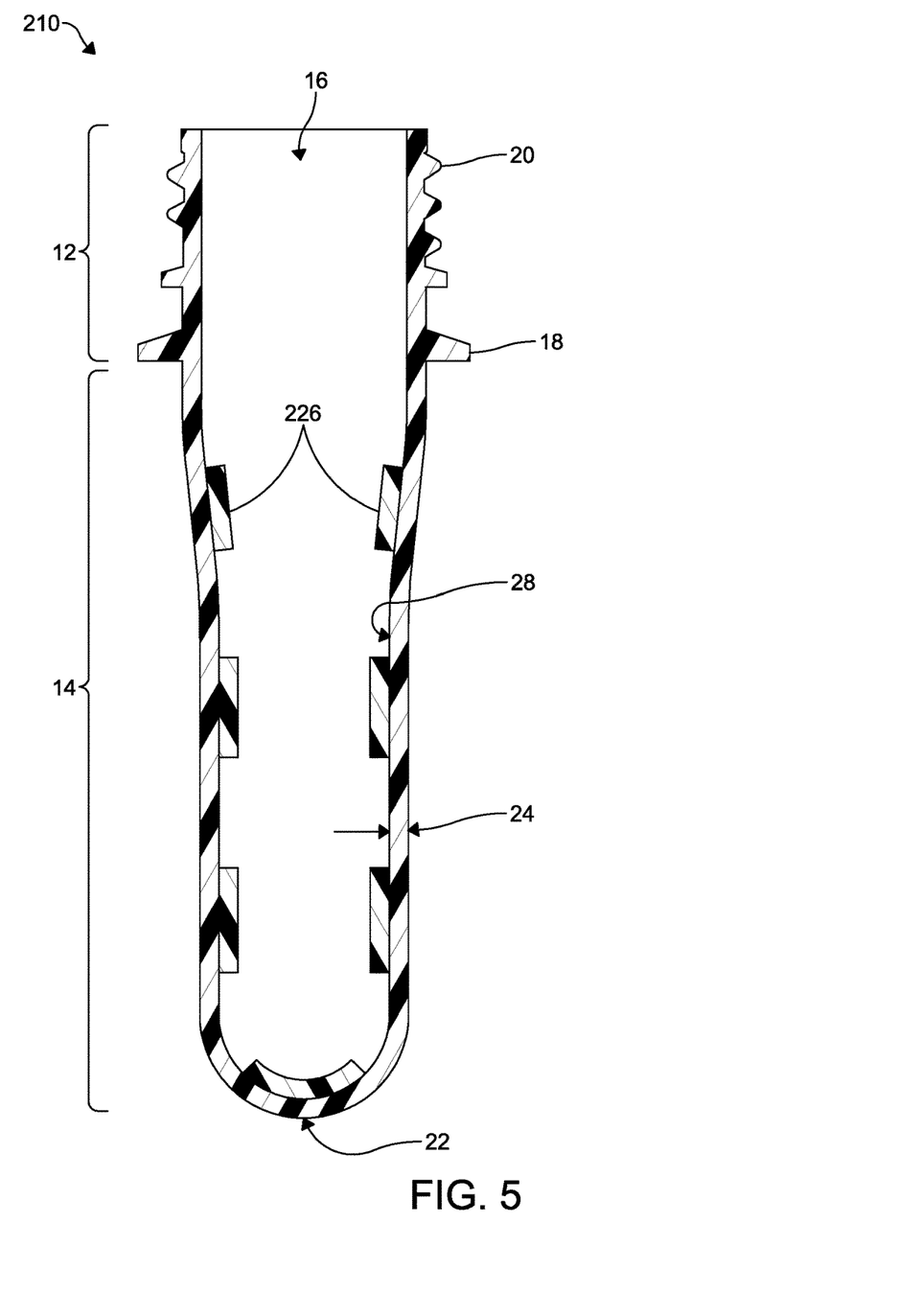
FIG. 5 is a cross-sectional view of a preform with a coating according to another embodiment of the invention.

FIG. 5 shows a preform 210 similar to the preform 10 described hereinabove and illustrated in FIGS. 1-3 except that a coating 226 is formed on an inner surface 28 thereof in a non-continuous (or broken) pattern. It is understood that the coating 226 may have a varied thickness, as desired. Where the coating 226 is deposited may depend on a number of factors including, but not limited to, the size of the preform 210, the shape of the preform 210, and the shape of a resulting container (not shown) of the preform 210 (e.g., an asymmetrically-shaped resulting container). It is desirable to include a thicker coating 226 where increased losses of heat energy from the preform 210 during the forming and filling process described herein are anticipated. It is understood that the non-continuous coating 226 may be formed in a symmetrical pattern or random pattern, as desired, and the coating 226 may be disposed along the entire inner surface 228 or on only a portion of the inner surface, as desired.

From the foregoing description, one ordinarily skilled in the art can easily ascertain the essential characteristics of this invention and, without departing from the spirit and scope thereof, can make various changes and modifications to the invention to adapt it to various usages and conditions.

I claim:

1. A preform for blow molding to form a plastic container comprising:
   a neck portion forming an opening providing fluid communication with an interior of the preform;
   a body portion having a closed end cap, the neck portion and the body portion forming an inner surface; and
   a coating formed on the inner surface of the body portion of the preform, the coating having a thermal conductivity less than a thermal conductivity of a material forming the preform, the coating being a sacrificial coating.

2. The preform of claim 1, wherein the coating has a uniform thickness.

3. The preform of claim 1, wherein the coating has a varied thickness.

4. The preform of claim 1, wherein the coating is formed on the inner surface in a non-continuous pattern.

5. The preform of claim 1, wherein the coating is frangible.

6. The preform of claim 1, wherein the coating is dissolvable in a liquid.

7. The preform of claim 1, wherein the coating is selected to maintain thermal properties of the preform during an expansion of the preform to ensure that the preform maintains a temperature at or above the phase change/solidification temperature of a material forming the body portion of the preform.

8. The preform of claim 7, wherein the coating is a gel.

9. The preform of claim 7, wherein the coating is a viscous liquid.

10. The preform of claim 7, wherein the coating is at least one of a jelly, silicone, paraffin wax, polypropylene, or a combination of the foregoing.

11. A method of simultaneously forming and filling a container comprising:
   disposing a heated preform having a coating on an inner surface thereof in a mold cavity, the coating having a thermal conductivity less than a thermal conductivity of a material forming the preform;
   delivering a liquid into the preform thereby expanding the preform and the coating toward an interior surface of the mold cavity to form a resulting container, wherein the coating reduces a loss of heat energy from the heated preform during the delivering step; and wherein the liquid remains within the container as an end product.

12. The method of claim 11, wherein the coating reduces a loss of heat energy from the heated preform during the delivering step to ensure the preform maintains a temperature at or above the phase change/solidification temperature of the material forming the preform.

13. The method of claim 11, wherein the coating dissolves in the liquid during the expanding of the preform.

14. The method of claim 11, wherein the coating is a constituent of the end product.

15. The method of claim 14, wherein the coating is at least one of a colorant, sugar, a surfactant, an odorizing agent.

16. The method of claim 11, wherein the coating evaporates during the delivering step.

17. The method of claim 11, wherein the coating is a sacrificial coating.

18. A method of simultaneously forming and filling a container comprising:

disposing a heated preform having a sacrificial coating on an inner surface thereof in a mold cavity, the coating having a thermal conductivity less than a thermal conductivity of a material forming the preform;

delivering a liquid into the preform thereby expanding the preform and the coating toward an interior surface of the mold cavity to form a resulting container, wherein the coating dissolves into the liquid or evaporates to reduce a loss of heat energy from the heated preform during the delivering step to ensure the preform maintains a temperature at or above the phase change/solidification temperature of the material forming the preform; and wherein the liquid remains within the container as an end product.

19. The method of claim 18, wherein the coating is a constituent of the end product.

20. The preform of claim 1, wherein the coating reduces a loss of heat energy from the preform to a liquid filling the preform during an expansion of the preform.

* * * * *